(12) United States Patent
Okamoto et al.

(10) Patent No.: US 7,402,356 B2
(45) Date of Patent: Jul. 22, 2008

(54) SOLID OXIDE ELECTROLYTE MATERIAL AND METHOD OF PRODUCING SOLID OXIDE ELECTROLYTE

(75) Inventors: Takashi Okamoto, Gunma (JP); Shunsuke Taniguchi, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 546 days.

(21) Appl. No.: 10/996,069

(22) Filed: Nov. 24, 2004

(65) Prior Publication Data
US 2005/0153189 A1 Jul. 14, 2005

(30) Foreign Application Priority Data
Nov. 28, 2003 (JP) .............................. 2003-399770

(51) Int. Cl.
*H01M 8/10* (2006.01)
(52) U.S. Cl. .............................. 429/33; 429/30; 429/46; 429/322; 429/304; 252/62.2
(58) Field of Classification Search .................. 429/30, 429/33, 322, 304; 252/62.2
See application file for complete search history.

(56) References Cited

U.S. PATENT DOCUMENTS 3,486,943 A * 12/1969 Widell .......................... 429/13
4,803,134 A * 2/1989 Sammells ..................... 429/30
5,527,633 A 6/1996 Kawasaki et al.

FOREIGN PATENT DOCUMENTS

| JP | 5170444 | 7/1993 |
|----|---------|--------|
| JP | 6103988 | 4/1994 |
| JP | 7006622 | 1/1995 |
| JP | 7149522 | 6/1995 |
| JP | 8073275 | 3/1996 |
| JP | 11086885 | 3/1999 |
| JP | 2000-164417 | 6/2000 |
| JP | 2003-051321 | 2/2003 |

\* cited by examiner

*Primary Examiner*—Laura S Weiner
(74) *Attorney, Agent, or Firm*—McDermott Will & Emery LLP

(57) ABSTRACT

A solid oxide electrolyte material comprising an electrolyte material 50 using oxygen ions as carriers as a base material and a lithium-containing compound 60 added to the base material as a sintering additive is sintered at a sintering temperature of 1300° C. or lower to produce a solid oxide electrolyte 100. This solid oxide electrolyte material can reduce the sintering temperature to extend the range of choices of components of a solid oxide fuel cell and suppress reactions between other components to reduce the manufacturing cost. This solid oxide electrolyte material further can produce a solid oxide electrolyte with sufficient denseness and high gas tightness capable of suppressing fuel leak to improve the electromotive force and output.

3 Claims, 4 Drawing Sheets

Fig. 1 (1)
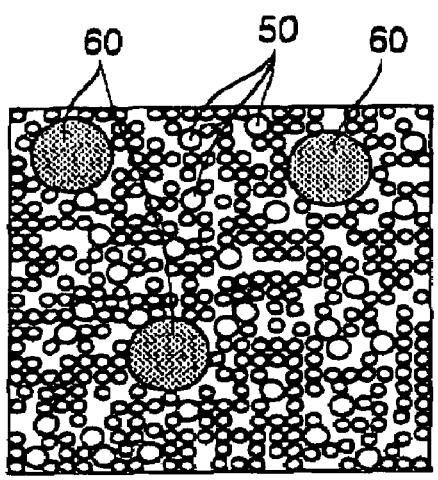
Fig. 1 (2)
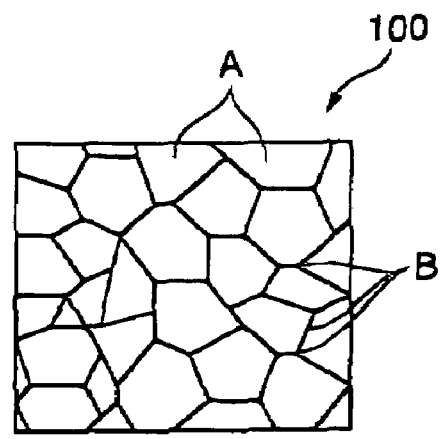
Fig. 2 (1)
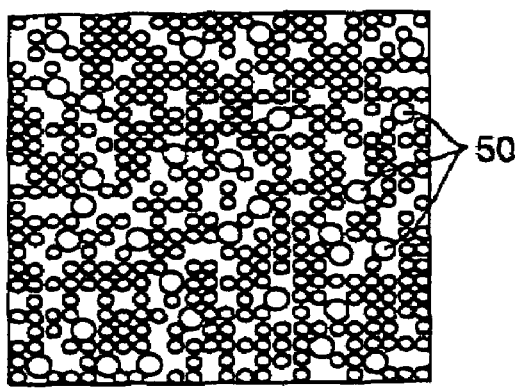
Fig. 2 (2)
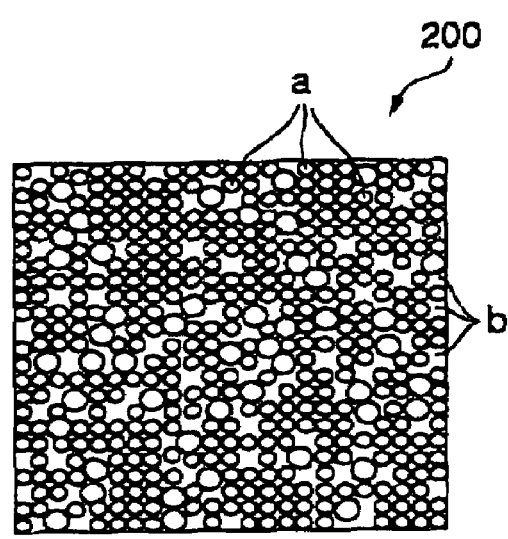

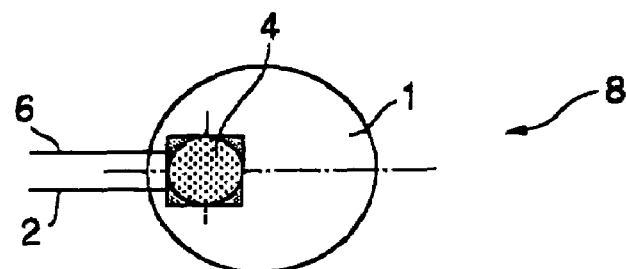
Fig. 3 (1)
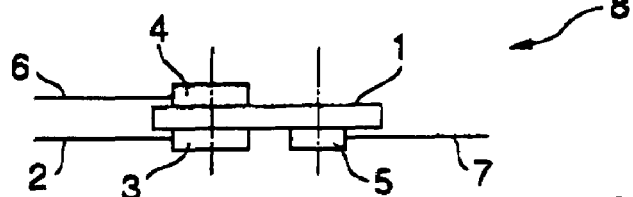
Fig. 3 (2)
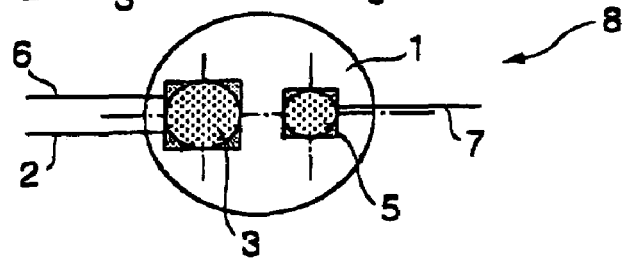
Fig. 3 (3)
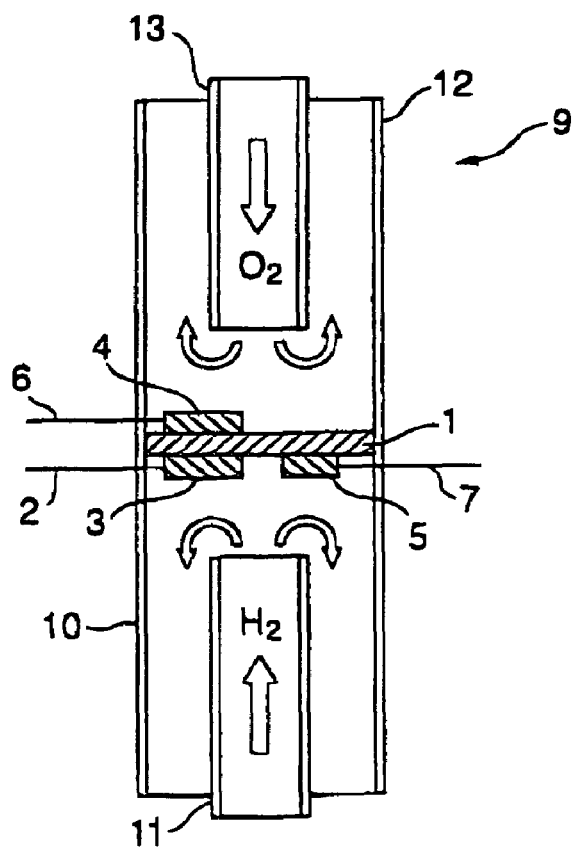
Fig. 4

SOLID OXIDE ELECTROLYTE MATERIAL AND METHOD OF PRODUCING SOLID OXIDE ELECTROLYTE

BACKGROUND OF THE INVENTION

1. Field of the Invention

The present invention relates to a solid oxide electrolyte material and a method of producing a solid oxide electrolyte.

2. Description of the Related Art

Conventionally, a solid oxide fuel cell using an electrolyte material with oxygen ion as carriers comprises an electrolyte consisting of an ion conductor, and a fuel electrode and an oxidizer electrode disposed on both sides thereof by baking, or further comprises a metallic or ceramic porous support base disposed on one side of the fuel electrode and/or the oxidizer electrode.

It is general to use a zirconia ($ZrO_2$) stabilized with yttria ($Y_2O_3$) (hereinafter often referred to as YSZ) as the electrolyte material, a nickel (Ni)-YSZ cermet produced by sintering NiO powder and the yttria-stabilized zirconia (YSZ) powder at a high temperature as the fuel electrode material, and a lanthanum-based perovskite composite oxide (LSM) as the oxidizer electrode material.

However, the high sintering temperature of the above-mentioned electrolyte material of about 1400° C. caused problems such as narrowing of the range of choices for components of the solid oxide fuel cell, reactions between other components, and an increase in cost due to limitation of an electric furnace or the like usable to the high-temperature process.

Conventionally, the following related arts are disclosed: A stabilized zirconia-alumina powder for solid oxide fuel cell including 5 wt % or less of high purity alumina dispersed to YSZ with a YSZ grain size/alumina grain size of 0.63 or more, a grain size of YSZ of 0.3 µm or less, and a grain size of alumina of 0.7 µm or less, which can be made to a solid electrolyte by sintering at about 1400° C. (refer to Japanese Patent Application Laid-Open No. 5-170444); a solid oxide fuel cell comprising a solid electrolyte consisting of a dense sintered body, comprising 1-15 atm % of at least one metal selected from manganese, iron, cobalt, nickel, copper, and zinc included in a solid electrolyte (YSZ) as an ion conductor (refer to Japanese Patent Application Laid-Open No. 6-103988); a ScSZ having a cubic phase as the dominant phase, which is obtained by adding 0.3-0.5 wt % of $Al_2O_3$ as a stabilizer to 8 mol % or more of ScSZ (refer to Japanese Patent Application Laid-Open No. 7-6622); a zirconia electrolyte powder capable of accelerating a solid phase reaction, which comprises 5 wt % or less of high-purity alumina powder added to a zirconia electrolytic powder including a dopant and having a sodium or sodium-based compound content of 2 wt % or less (refer to Japanese Patent Application Laid-Open No. 7-149522); a starting material for sintering consisting of a powder obtained by mixing a low-melting point material with a high-melting point material hardly forming a compound followed by fusing, solidifying and pulverizing (refer to Japanese Patent Application Laid-Open No. 8-73275); a cell for a solid oxide fuel cell having a solid electrolyte containing an oxidizer consisting of at least either one of $Al_2O_3$ and $Bi_2O_3$ (refer to Japanese Patent Application Laid-Open No. 11-86885); a magnetic composition including a ferrite and a sintering additive free from boron such as silicate glass, which can be sintered at a low temperature (refer to Japanese Patent Application Laid-Open No. 2000-164417); and a ScSZ including $Bi_2O_3$ added as sintering additive (a solid electrolyte material with low-temperature sintering property) (Japanese Patent Application Laid-Open No. 2003-51321).

SUMMARY OF THE INVENTION

The first object of the present invention is to solve the conventional problems and provide a solid oxide electrolyte material capable of reducing the sintering temperature, extending the range of choices for components of a solid oxide fuel cell and suppressing reactions between other components to reduce the manufacturing cost, which further can produce a solid oxide electrolyte with sufficient denseness and high gas tightness capable of suppressing fuel leak, even if thinned, to improve the output.

The second object of the present invention is to provide a method of producing a solid oxide electrolyte by use of such a solid oxide electrolyte material.

In order to solve the above-mentioned problems, a solid oxide electrolyte material according to the first aspect of the present invention comprises an electrolyte material with oxygen ions as carriers as a base material and a lithium-containing compound added to the base material as a sintering additive.

A solid oxide electrolyte material according to the second aspect of the present invention is characterized by that, in the solid oxide electrolyte material of the first aspect of the present invention, powdery lithium oxide ($Li_2O$) is added as the sintering additive to the electrolyte material powdered.

A solid oxide electrolyte material according to the third aspect of the present invention is characterized by that, in the solid oxide electrolyte material of the first or second aspect of the present invention, the powdered electrolyte material is impregnated with a solution containing lithium followed by drying to cover the powdered electrolyte material with the lithium-containing compound, whereby the lithium-containing compound is added to the powdered electrolyte material.

A solid oxide electrolyte material according to the fourth aspect of the present invention is characterized by that, in the solid oxide electrolyte material of the first or second aspect of the present invention, a compact obtained by molding the electrolyte material or a compact obtained by further heat-treating it is impregnated with the solution containing lithium followed by drying, whereby the grains constituting the electrolyte material are covered with the lithium-containing compound, and pores formed between the grains are filled with the lithium-containing compound.

A method of producing a solid oxide electrolyte according to the fifth aspect of the present invention comprises sintering a solid oxide electrolyte material of any one of the first to fourth aspects of the present invention at a sintering temperature of 1300° C. or lower to produce the solid oxide electrolyte.

The solid oxide electrolyte material of the first aspect of the present invention can reduce the sintering temperature by using the electrolyte material with oxygen ions as carriers as the base material and adding the lithium-containing compound to the base material as the sintering additive and, consequently, can extend the range of choices for components of the solid oxide fuel cell and suppress reactions between other components to reduce the manufacturing cost. This solid oxide electrolyte material has a remarkable effect that a solid oxide electrolyte with sufficient denseness and high gas tightness capable of suppressing fuel leak, even if thinned, to improve the electromotive force and output can be produced.

The solid oxide electrolyte material of the second aspect of the present invention has a further remarkable effect that an inexpensive homogeneous solid oxide electrolyte of high quality can be easily produced by adding, in the solid oxide electrolyte material of the first aspect, powdery lithium oxide ($Li_2O$) to the powdered electrolyte material as the sintering additive.

In the solid oxide electrolyte material of the third embodiment of the present invention, the powdered electrolyte material in the solid oxide electrolyte material of the first or second aspect of the present invention is impregnated with a solution containing lithium followed by drying to cover the powdered electrolyte material with the lithium-containing compound, whereby the lithium-containing compound is added to the powdered electrolyte material. Therefore, when it is sintered in this state, the lithium effectively functions as the sintering additive to provide a further remarkable effect that an inexpensive homogeneous solid oxide electrolyte of high quality can be further easily produced.

In the solid oxide electrolyte material of the fourth aspect of the present invention, a compact obtained by molding the electrolyte material, in the solid oxide electrolyte material of the first or second aspect of the present invention, or a compact obtained by further heat-treating it is impregnated with the solution containing lithium followed by drying, whereby the grains constituting the electrolyte material are covered with the lithium-containing compound, and pores formed between the grains are filled with the lithium-containing compound. Therefore, when it is sintered in this state, the lithium effectively functions as the sintering additive to provide a further remarkable effect that an inexpensive homogeneous solid oxide electrolyte of high quality can be further easily produced.

The method of producing a solid oxide electrolyte of the fifth aspect of the present invention is characterized by sintering the solid oxide electrolyte material of any one of the first to fourth aspects of the present invention at a sintering temperature of 1300° C. or lower. Since the sintering is carried out at a low temperature, this method has a remarkable effect that the range of choices for components of the solid oxide fuel cell can be extended while suppressing reactions between other components to reduce the manufacturing cost, and a solid oxide electrolyte with sufficient denseness and high gas tightness capable of suppressing fuel leak, even if thinned, to improve the electromotive force and output can be easily produced.

BRIEF DESCRIPTION OF THE DRAWINGS

FIG. 1 schematically show electron micrographs of a solid oxide electrolyte according to the present invention, wherein (1) is an illustrative view schematically showing the state where powdered lithium oxide is added and mixed to powdery YSZ followed by pulverizing, and molded, and (2) is an illustrative view schematically showing the resulting solid oxide electrolyte after sintering at 1100° C.;

FIG. 2 schematically show electron micrographs of a solid oxide electrolyte material for comparison, wherein (1) is an illustrative view schematically showing the state where powdery YSZ is mixed followed by pulverizing, and molded, and (2) is an illustrative view schematically showing the resulting solid oxide electrolyte after sintering at 1100° C.;

FIG. 3 show an example of a test cell, wherein (1) is a plane view of the test cell, (2) is a sectional view of the test cell, and (3) is a bottom view of the test cell;

FIG. 4 is an illustrative view of a power generation test device provided with the test cell;

DESCRIPTION OF THE PREFERRED EMBOIDMENTS

Figure 5:
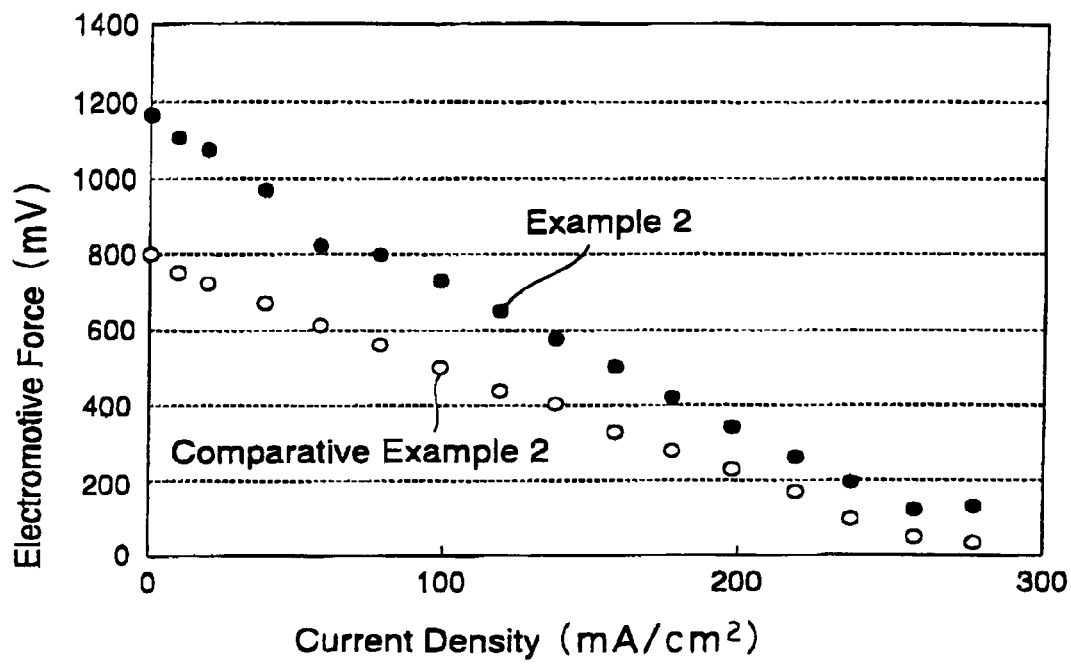
FIG. 5 is a graph showing the relation between electromotive force (mV) and current density ($mA/cm^2$)

The solid oxide electrolyte material of the present invention can be easily obtained by using an electrolyte material with oxygen ions as carriers such as YSZ as a base material, adding a lithium-containing compound to the base material as a sintering additive followed by sufficiently mixing and pulverizing. The solid oxide electrolyte material of the present invention can be also obtained by means of copreciptation, sintering synthesis or the like.

In the present invention, addition of powdery lithium oxide to the powdered electrolyte material as the sintering additive is preferable, since the powdery lithium oxide is easily available and homogenously mixable and pluverizable, and an inexpensive solid oxide electrolyte of high quality can be easily produced by properly molding the resulting mixture followed by sintering.

The lithium-containing compound used in the present invention is not particularly limited, and any of inorganic substances, organic substances, and mixtures thereof containing Li can be used. Concrete examples thereof include an oxide such as lithium oxide ($Li_2O$), an inorganic substance such as lithium hydroxide, lithium carbonate, and other various salts, or organometallic compound.

The addition amount of the lithium-containing compound as the sintering additive is preferably set to about 0.01-30 mass % in terms of lithium oxide ($Li_2O$) to the total amount of the electrolyte material. The larger amount is better since the working effect as the sintering additive might be insufficient with less than 0.01 mass %. However, an amount exceeding 30 mass % is not preferable because it might be precipitated to the grain boundary after sintering to affect the denseness or gas tightness.

By utilizing the water-solubility of lithium oxide, in the present invention, the powdered electrolyte material is preferably dispersed in an aqueous solution of lithium oxide dissolved in water followed by drying, whereby the powdered electrolyte material is covered with the lithium oxide. According to this, a homogenous mixture of the both can be easily obtained. It may be further pulverized and homogenously mixed, and the resulting mixture is properly molded and sintered, whereby an inexpensive solid oxide electrolyte of high quality can be easily produced.

The solution containing lithium used in the present invention is not limited to the aqueous solution. Any solution using a solvent capable of dissolving a lithium-containing compound such as lithium oxide, lithium hydroxide or lithium carbonate can be used.

In the present invention, the compact obtained by molding the electrolyte material, or the compact obtained by further heat-treating it is preferably impregnated with an aqueous solution of powdery lithium oxide dissolved in water followed by drying, whereby the grains constituting the electrolyte material are covered with the lithium oxide, and pores formed between grains are filled with the lithium oxide. When it is sintered in this state, lithium effectively functions as the sintering additive. Therefore, even if the addition amount of the lithium-containing compound is a trace of 1 mass % or less and, further, an ultratrace of 0.1 mass % or less, the compound can effectively function as the sintering assistant, and an inexpensive homogenous solid oxide electrolyte of high quality can be further easily produced.

Even if the solid oxide electrolyte material of the present invention is sintered at 1300° C. or lower, for example, at a low temperature of about 1100° C., a solid oxide electrolyte with sufficient denseness and high gas tightness capable of improving the output can be sufficiently produced.

The present invention will be further described in detail according to examples. The present invention is never limited by these examples.

EXAMPLE 1

To a powdery YSZ (electrolyte material) 5 mass % of powdery lithium oxide ($Li_2O$) was added as a sintering additive, and the mixture was sufficiently mixed and pulverized by use of a mortar. The resulting powder was molded by use of a tableting machine, and sintered at 1100° C. to obtain a solid oxide electrolyte according to the present invention.

Electron micrographs of the solid oxide electrolyte of the present invention are schematically shown in FIGS. 1(1) and (2). FIG. 1 (1) is an illustrative view schematically showing the state where the powdery lithium oxide was added and mixed to the powdery YSZ followed by pulverizing and molding, and FIG. 1(2) is an illustrative view schematically showing the resulting solid oxide electrolyte after sintering at 1100° C.

In FIG. 1(1), denoted at 50 is the powdery YSZ, and 60 is the powdery lithium oxide. In FIG. 1(2), denoted at A is a crystal grain of the solid oxide electrolyte after sintering at 1100° C., and B is a pore between crystal grains A and A.

When the mixture shown in FIG. 1(1) is sintering at 1100° C., it is densified with a considerably reduced volume, and the solid oxide electrolyte 100 of the present invention has a form in which large crystal grains A are closely collected, as shown in FIG. 1(2), and is high in denseness and gas tightness as the whole with a minimized number of pores B between crystal grains A and A and an extremely small size of pores B. When the denseness and gas tightness are high as the whole, fuel leak is suppressed to improve the electromotive force and output, and the conversion rate of fuel to electric power is increased.

To quantitatively determine the gas permeability of the solid oxide electrolyte 100 (pellet-like compact) of the present invention, the gas permeability (sec) of the solid oxide electrolyte 100 was measured by use of a Gurley densometer. High gas tightness could be confirmed from the resulting gas permeability of 362.

COMPARATIVE EXAMPLE 1

Electron micrographs of a solid oxide electrolyte for comparison obtained by performing the same procedure except not adding the powdery lithium oxide are schematically shown in FIGS. 2(1) and (2).

FIG. 2(1) is an illustrative view schematically showing the state where powdery YSZ was mixed followed by pulverizing, and molded, and FIG. 2(2) is an illustrative view schematically showing the resulting solid oxide electrolyte for comparison after sintering at 1100° C.

In FIG. 2(1), denoted at 50 is the powdery YSZ, and in FIG. 2(2) denoted at a is the crystal grain of the solid oxide electrolyte for comparison after sintering at 1100° C., and b is a pore between crystal grains a and a.

When the mixture shown in FIG. 2(1) is sintered at 1100° C., the pores are reduced with a slight reduction in volume, as shown in FIG. 2(2). However, the solid oxide electrolyte 200 for comparison has a form in which small crystal grains a are roughly dispersed, and is low in denseness and gas tightness as the whole with an increased number of pores b between crystal grains a and a, and a large size of pores b. When the denseness and gas tightness are low as the whole, fuel gas is permeated and leaked, and the electromotive force and output are reduced to deteriorate the conversion rate of fuel to electric power.

The gas permeability of the solid oxide electrolyte 200 (pellet-like compact) for comparison measured in the same manner as in Example 1 was 262 sec. Consequently, it was confirmed that this electrolyte was inferior in gas tightness, compared with the solid oxide electrolyte 100 of the present invention of Example 1.

The solid oxide electrolyte 100 (pellet-like compact) of the present invention of Example 1 and the solid oxide electrolyte 200 (pellet-like compact) for comparison of Comparative Example 1 were subjected to X-ray diffraction (XRD) to examine their crystalline structures. The results are shown in FIGS. 6 and 7.

Figure 6:
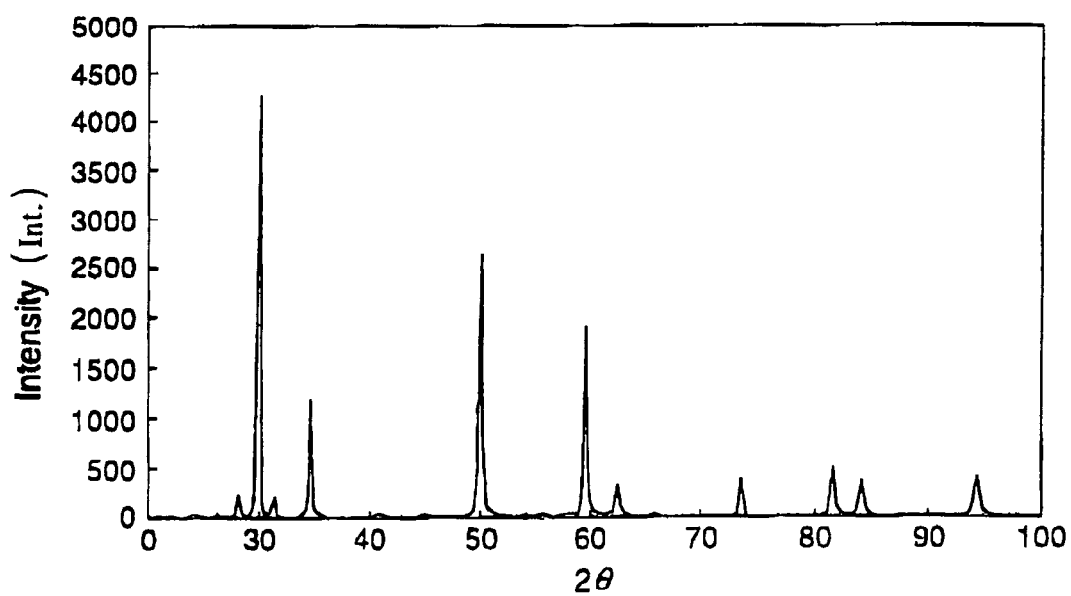
FIG. 6 is a graph showing the result of X-ray diffraction (XRD) of the solid oxide electrolyte according to the present invention.
Figure 7:
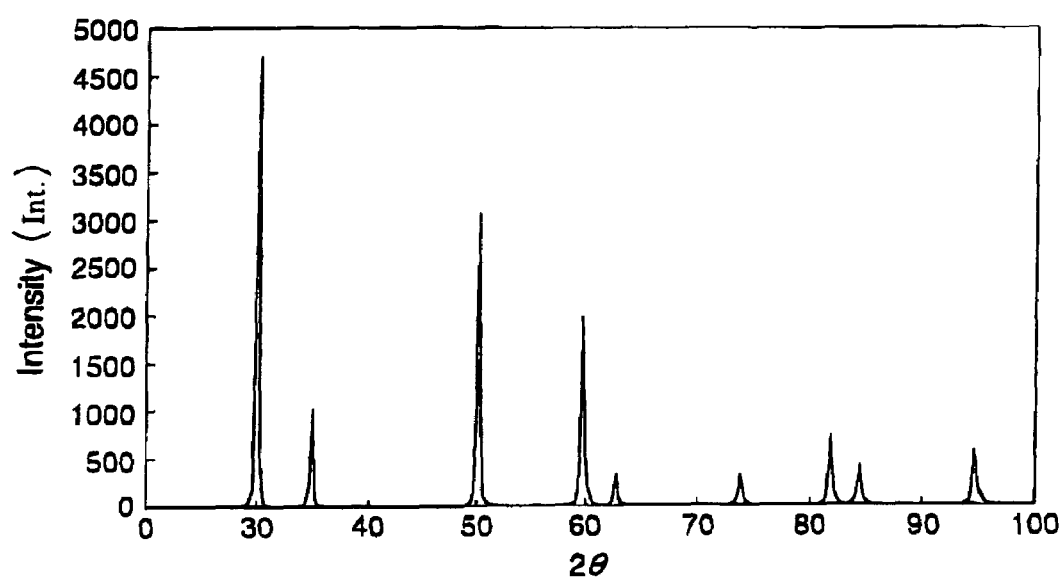
FIG. 7 is a graph showing the result of X-ray diffraction (XRD) of the solid oxide electrolyte for comparison.

In FIGS. 6 and 7, the horizontal axis shows 2e, and the vertical axis shows intensity.

As is apparent from FIGS. 6 and 7, cubic phases are predominant in the solid oxide electrolyte 100 of the present invention and the solid oxide electrolyte 200 for comparison of Comparative Example 1, which showed that the addition of the powdery lithium oxide hardly has an influence on the crystalline structure.

EXAMPLE 2

A sheet-like compact obtained by molding the powdery YSZ (electrolyte material) electrolyte material molded in a sheet shape followed by sintered at 1100° C. was impregnated with an aqueous solution of powdery lithium oxide dissolved in water followed by drying to cover the grains constituting the compact with the lithium oxide and fill the pores formed between the grains with the lithium oxide. The resulting compact was sintered at 1100° C. again to form a sheet-like solid oxide electrolyte.

From an electron micrograph of the thus-obtained solid oxide electrolyte taken in the same manner as in Example 1, the electrolyte is found to be a solid oxide electrolyte which has a form in which large crystal grains A are closely collected, as shown in FIG. 1(2), with a small number of pores B between the crystal grains A and A and an extremely small size of the pores B, and is high in denseness and gas tightness as the whole.

An example of a test cell formed by use of the thus-obtained solid oxide electrolyte is shown in FIGS. 3(1)-(3). FIG. 3(1) is a plan view of the test cell, (2) is a sectional view of the test cell, and (3) is a bottom view of the test cell.

As shown in FIG. 3, Pt paste is applied to predetermined positions on both sides of the sheet-like solid oxide electrolyte 1 of the present invention to mount a fuel electrode 3, a counter electrode 4, a reference electrode 5 and Pt wires 2, 6 and 7 for current collection, and the resulting electrolyte was baked at a predetermined temperature to obtain a test cell 8.

FIG. 4 is an illustrative view of a power generation testing device 9 formed by use of the thus-obtained test cell 8.

In FIG. 4, denoted at 10 is an outer cylinder on the fuel electrode 3 side, 11 is an inner cylinder on the fuel electrode 3 side, 12 is an outer cylinder on the counter electrode 4 (oxidizer electrode) side, and 13 is an inner cylinder on the counter electrode 4 (oxidizer electrode) side. A power generation test is carried out by supplying hydrogen into the inner cylinder 11 on the fuel electrode 3 side, as shown by an arrow, followed by discharging through between the outer cylinder 10 and the inner cylinder 11, and supplying air ($O_2$) into the inner cylinder 13 on the counter electrode 4 (oxidizer electrode) side as shown by an arrow followed by discharging through between the outer cylinder 12 and the inner cylinder 13.

The power generation test was carried out at an operation temperature of 1000° C. by use of the power generation testing device 9 shown in FIG. 4 to evaluate current density (mA/cm$^2$)—electromotive force (mV). The result is shown in FIG. 5.

In FIG. 5, the horizontal axis shows current density, and the vertical axis shows electromotive force.

COMPARATIVE EXAMPLE 2

The evaluation of the test cell 8 was carried out in the same manner as in Example 2 except using the sheet-like compact obtained by molding the powdery YSZ (electrolyte material) electrolyte material followed by sintering at 1100° C. as the solid oxide electrolyte for comparison as it is, and the current density (mA/cm$^2$)—electromotive force (mV) was evaluated. The result is shown also in FIG. 5.

As is apparent from FIG. 5, in Example 2 using the sheet-like solid oxide electrolyte of the present invention, fuel leak (cross leak) is suppressed because of high denseness and gas tightness of the solid oxide electrolyte to provide a high electromotive force, while in Comparative Example 2 using the solid oxide electrolyte for comparison, the fuel leak (cross leak) is increased because of the inferior denseness and gas tightness to reduce the electromotive force.

Since the solid oxide electrolyte material of the present invention comprises an electrolyte material with oxygen ion as carriers as a base material, and a lithium-containing compound added to the base material as a sintering additive, the sintering temperature can be reduced to extend the range of choices for components of a solid oxide fuel cell, and reactions between other components can be also suppressed to reduce the manufacturing cost. Further, since a solid oxide electrolyte capable of suppressing fuel leak (cross leak), even if thinned because of sufficient denseness and high gas tightness to improve the electromotive force and output can be produced, this solid oxide electrolyte material has a high industrial availability.

According to the method of producing a solid oxide electrolyte of the present invention, since the solid oxide electrolyte material of the present invention is sintered at a low temperature, the range of choices for components of a solid oxide fuel cell can be extended, and reactions between other components can be suppressed to reduce the manufacturing cost. Further, a solid oxide electrolyte capable of suppressing fuel leak (cross leak), even if thinned, because of sufficient denseness and high gas tightness to improve the electromotive force and output can be easily produced.

What is claimed is:

1. A solid oxide electrolyte material, comprising:
    a powdered electrolyte material comprising YSZ with oxygen ions as carriers impregnated with a solution of a lithium-containing compound followed by drying to cover said powdered electrolyte material with said lithium-containing compound.

2. A solid oxide electrolyte material, comprising:
    a compact obtained by molding a powdered electrolyte material comprising YSZ with oxygen ions as carriers or a product obtained by further heat-treating the compact, wherein the compact or the product is further impregnated with a solution of a lithium-containing compound followed by drying, whereby grains constituting said electrolyte material of the compact or the product are covered with said lithium-containing compound, and pores formed between grains are filled with said lithium-containing compound.

3. A method of producing a solid oxide electrolyte, comprising:
    sintering a solid oxide electrolyte material of claim 1 or 2, at a sintering temperature of 1300° C. or lower to produce the solid oxide electrolyte.

* * * * *